(12) United States Patent
Romagnoli et al.

(10) Patent No.: US 7,233,729 B2
(45) Date of Patent: Jun. 19, 2007

(54) METHOD FOR GUIDING AN ELECTROMAGNETIC RADIATION, IN PARTICULAR IN AN INTEGRATED OPTICAL DEVICE

(75) Inventors: Marco Romagnoli, Milan (IT); Maurizio Tormen, Belluno (IT); Camilla Bonati, Milan (IT)

(73) Assignee: Pirelli & C. S.p.A., Milan (IT)

( * ) Notice: Subject to any disclaimer, the term of this patent is extended or adjusted under 35 U.S.C. 154(b) by 44 days.

(21) Appl. No.: 10/506,658

(22) PCT Filed: Mar. 6, 2002

(86) PCT No.: PCT/EP02/02466

§ 371 (c)(1), (2), (4) Date: Apr. 21, 2005

(87) PCT Pub. No.: WO03/075055

PCT Pub. Date: Sep. 12, 2003

(65) Prior Publication Data

US 2005/0175304 A1 Aug. 11, 2005

(51) Int. Cl.
G02B 6/26 (2006.01)
G02B 6/12 (2006.01)

(52) U.S. Cl. .................... 385/129; 385/39; 385/50

(58) Field of Classification Search ............... 385/39, 385/50, 129, 141
See application file for complete search history.

(56) References Cited

U.S. PATENT DOCUMENTS 5,526,449 A 6/1996 Meade et al.

(Continued)

FOREIGN PATENT DOCUMENTS

EP 0 764 861 A2 3/1997

(Continued)

OTHER PUBLICATIONS

Kosaka, H. et al.; "Photonic-Crystal Spot-Size Converter"; Applied Physics Letters, vol. 76, No. 3, pp. 268-270, (Jan. 17, 2000).

(Continued)

*Primary Examiner*—Sung Pak
*Assistant Examiner*—Tina M. Wong
(74) *Attorney, Agent, or Firm*—Finnegan, Henderson, Farabow, Garrett & Dunner, L.L.P.

(57) ABSTRACT

A method for guiding electromagnetic radiation by providing a photonic crystal made of a bulk material with a predetermined refractive index and having a periodic array of holes with predetermined radius, and feeding to that region an electromagnetic radiation having a wavelength in the fundamental photonic band and so related to the refractive index of the bulk material, to the radius of the holes and to the period of the array that, starting from an isotropic distribution of the wave vectors within a first angular range that is twice the angular extension of the first irreducible Brillouin zone of the photonic crystal, the corresponding group velocity vectors are rearranged as concerns direction and module so that at least 50% of them become directed within a second angular range that is about one-third of the first angular range and the width at half-maximum of the distribution of the modules of the vectors is lower than about two-thirds of the second angular range.

19 Claims, 10 Drawing Sheets

U.S. PATENT DOCUMENTS

| | | | |
|---|---|---|---|
| 5,999,308 A * | 12/1999 | Nelson et al. | 359/321 |
| 6,064,511 A | 5/2000 | Fortmann et al. | |
| 6,134,369 A | 10/2000 | Kurosawa | |
| 6,198,860 B1 | 3/2001 | Johnson et al. | |
| 6,317,554 B1 | 11/2001 | Kosaka et al. | |
| 6,738,551 B2 * | 5/2004 | Noda et al. | 385/130 |
| 2005/0226561 A1 * | 10/2005 | Romagnoli et al. | 385/39 |
| 2005/0226562 A1 * | 10/2005 | Romagnoli et al. | 385/39 |

FOREIGN PATENT DOCUMENTS

| | | |
|---|---|---|
| EP | 0 764 861 A3 | 3/1997 |
| WO | WO 03/075054 A1 | 9/2003 |
| WO | WO 03/075056 A1 | 9/2003 |

OTHER PUBLICATIONS

Joannopoulos; J. D., "The Almost-Magical World of Photonic Crystals"; Brazilian Journal of Physics, vol. 26, No. 1, pp. 58-67, (Mar. 1996).

Aretz, K. et al.; "Reduction of Crosstalk and Losses of Intersecting Waveguide"; Electronics Letters, IEE Stevenage, GB, vol. 25, No. 11, pp. 730-731, (May 25, 1989).

Kosaka, H. et al.; "Self-Collimating Phenomena in Photonic Crystals"; Applied Physics Letters, vol. 74, No. 9, pp. 1212-1214, (Mar. 1, 1999).

Romanov, S. G. et al.; "Photonic Band-Gap Effects Upon the Light Emission from a Dye-Polymer-Opal Composite"; Applied Physics Letters, vol. 75, No. 8, pp. 1057-1059, (Aug. 23, 1999).

Etchegoin, P. et al.; "Photon Focusing, Internal Diffraction, and Surface States in Periodic Dielectric Structures"; Physical Review, B vol. 53, No. 19, pp. 12674-12683, (May 15, 1996).

Johnson, S. G. et al.; "Guided Modes in Photonic Crystal Slabs"; Physical Review B, vol. 60, No. 8, pp. 5751-5758, (Aug. 15, 1999).

Chow, E. et al.; "Three-Dimensional Control of Light in a Two-Dimensional Photonic Crystal Slab"; Nature, vol. 407, No. 6807, pp. 983-986, (Oct. 26, 2000).

Johnson, S. G. et al.; "Elimination of Cross Talk in Waveguide Intersections"; Optical Society of America, Optics Letters, vol. 23, No. 23, pp. 1855-1857, (Dec. 1, 1998).

Lončar et al., "Three-Dimensional Analysis of Dispersion Properties of Planar Photonic Crystals", Proceedings of PECS III Conference, pp. 1-2, (2001).

Ashcroft et al., "Solid State Physics", International Edition, Sanders College Publishing, p. 89.

Lončar et al., "Design and Fabrication of Silicon Photonic Crystal Optical Waveguides", IEEE Journal of Lightwave Technology, vol. 18, No. 10, pp. 1402-1411, (2000).

Espinola, R. L. et al, "A Study of High-Index-Contrast 90° Waveguide Bend Structures", Optics Express, vol. 8, No. 9, pp. 517-528, (Apr. 23, 2001).

Yang, W. et al., "Design of Planar Optical Waveguide Corners with Turning Mirrors", Proceedings of Integrated Optics, Technical Digest Series, vol. 6, pp. 58-63, (1996).

Manolatou, C. et al., "High-Density Integrated Optics", Journal of Lightwave Technology, vol. 17, No. 9, pp. 1682-1692, (Sep. 1999).

Mekis, A. et al., "High Transmission through Sharp Bends in Photonic Crystal Waveguides", Phys. Rev. Lett., vol. 77, pp. 3787-3790, (1996).

Meade, R. D. et al., "Novel Application of Photonic Band Gap Materials: Low-Loss Bends and High Q Cavities", J. App. Phys., vol. 75, pp. 4753-4755, (1994).

Chow, E. et al., "Quantitative Analysis of Bending Efficiency in Photonic-Crystal Waveguide Bends at $\lambda=1.55$ μm Wavelengths", Optics Letters, vol. 26, No. 5, (Mar. 1, 2001).

* cited by examiner

R=0.21

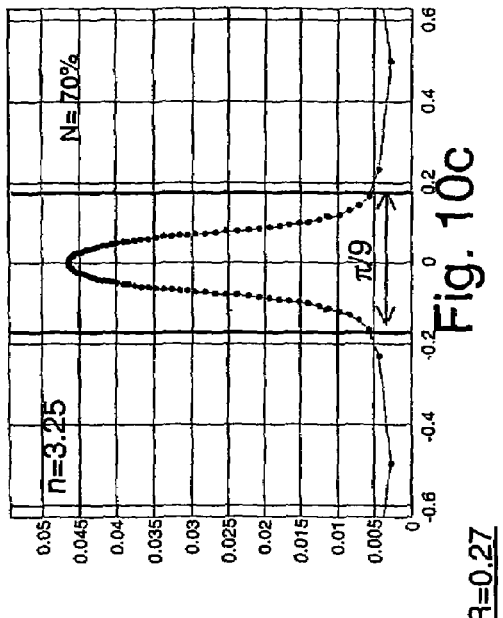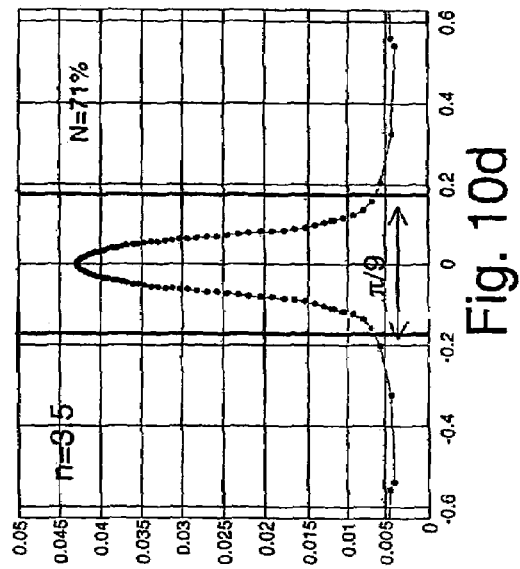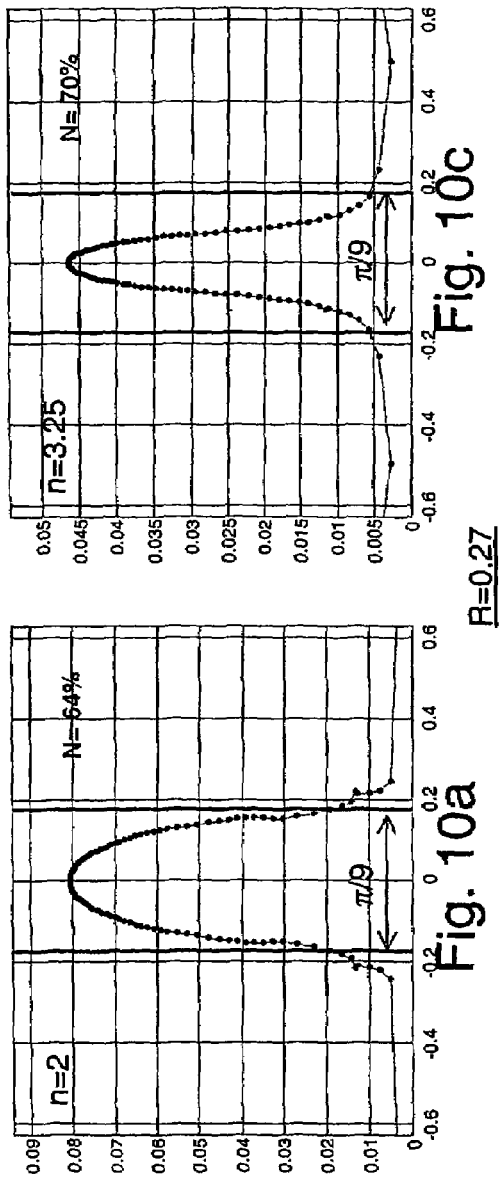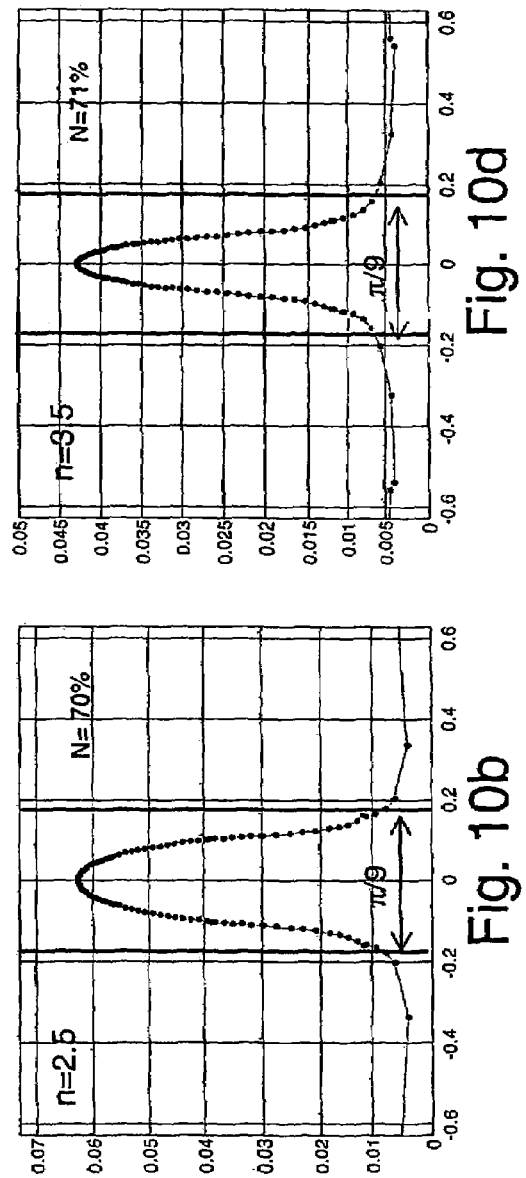

METHOD FOR GUIDING AN ELECTROMAGNETIC RADIATION, IN PARTICULAR IN AN INTEGRATED OPTICAL DEVICE

CROSS REFERENCE TO RELATED APPLICATION

This application is a national phase application based on PCT/EP02/02466, filed Mar. 6, 2002, the content of which is incorporated herein by reference.

BACKGROUND OF THE INVENTION

1. Field of the Invention

The present invention relates to a method for guiding an electromagnetic radiation, in particular in an integrated optical device for optical telecommunications.

2. Description of the Related Art

In optical telecommunication systems, information is typically coded in short optical pulses by suitable optical sources, such as light-emitting diodes (LEDs) or semiconductor lasers, which pulses are transmitted along an optical-fibre network and received by photodetectors. Many different signals can be transmitted using a single wavelength of light by interweaving the pulses from different sources, a technique known as time-division multiplexing (TDM).

A simple way of increasing the amount of data that can be transmitted by a single optical fibre is to make the incoming electronic bits as short as possible. Current optical telecommunication systems have achieved data rates up to 40 gigabits per second.

Recently, transmission capacity has been increased by means of dense wavelength division multiplexing (DWDM), which requires a very stable emitting laser and, at the receiver, very narrow linewidth filters and optical switches for separating individual wavelength channels and routing them to the appropriate destinations. Due to the large number of individual components in a DWDM system, integrated optical circuits have been developed. Integrated optical circuits may be either monolithic or hybrid and comprise active and passive components, typically realized on a semiconductor or dielectric substrate, used for coupling between optoelectronic devices and providing signal processing functions.

Improvements in optical integration have recently been obtained by the use of photonic crystals. Photonic crystals are dielectric structures having a periodic variation (or modulation) of the dielectric constant along one, two or three directions of space (and the crystal is therefore referred to as a 1-D, 2-D or 3-D photonic crystal). A 2-D photonic crystal typically comprises a piece of dielectric material (for example an optically thin slab) wherein a periodic array of regions of different refractive index is realized. These regions may be defined, for example, by cylinders filled of air, wherein the refractive index is substantially equal to 1. The regions of lower refractive index can be considered as scattering centres, and light at predetermined wavelengths is coherently scattered.

Motion of photons entering such crystal is, depending on-their energy, influenced in a different way by said refractive index variations; in particular, photons will tend to be confined and trapped or be allowed to propagate according to their wavelength. In particular, it is possible to identify energy bands, wherein light transmission is permitted, and "photonic band gaps", separating these bands, wherein light transmission is forbidden.

Photonic crystals have been made suitable to guide light by providing waveguiding regions wherein the dielectric material is homogeneous and have therefore no variation of the refractive index. These regions, which are typically considered as regions of "defects", since they break the periodicity of the structure, are suitable to guide electromagnetic radiation at wavelengths within photonic band-gaps. For example, in a 2-D photonic crystal having a periodic array of holes, the absence of a hole defines a defect and the absence of one or more lines of holes defines a corresponding line of defects.

U.S. Pat. No. 5,999,308, for example, describes an all-optical or optoelectronic integrated circuit wherein a photonic crystal defines a waveguide connecting two devices, suitable to guide electromagnetic radiation at wavelengths within the photonic band-gap. The photonic crystal has a triangular array of rods, for example filled of air, and the waveguide is defined by a line of "defects", i.e. a linear region wherein rods are absent.

The Applicant observes that, in integrated optical circuits, light guiding has always been performed by means of waveguides of predetermined and unchangeable direction, dimension and position, by taking advantage either of the internal reflection properties of the interface between two materials of different refractive index, as in the more conventional waveguides in integrated optics, or of the light confinement effect of a region of defects in a photonic crystal.

Photonic crystals, whose guiding properties within region of defects have been amply investigated and demonstrated under various conditions and configurations, have also been the subject of studies under conditions of absence of defects, i.e. under condition of regular and continuous periodicity. For the purposes of the present invention, with "photonic crystals having regular periodicity" it is intended a photonic crystal wherein the characteristics of its periodic array do not vary at least in a region thereof of intended light propagation.

The article of P. Etchegoin and R. T. Phillips, "*Photon focusing, internal diffraction, and surface states in periodic dielectric structures*", Physical Review B, Volume 53, Number 19, 15 May 1996-1, takes advantage of some analogies between electrons in semiconductors and electromagnetic waves in periodic dielectric structures for providing a method for calculation the band structure of a 2-D periodic dielectric structure. Moreover, this article deals with the phenomenon of photon focusing emitted by a source point in these structure, in analogy with the phenomenon of acoustic phonon focusing, showing what shape shall have the $k_x$–$k_y$ diagram of the wave vector k to have focusing of light along predetermined directions.

The Applicant observes that, besides having being studied only at theoretical level, applications of photon focusing would be of limited use in integrated optics.

The article of Marko Lončar, Jelena Vučkovič and Axel Scherer, "*Three-dimensional analysis of dispersion properties of planar photonic crystals*", Proceedings of PECS III conference (June 2001), St Andrew's, Scotland. shows that a planar (i.e. 2-D) photonic crystal may have, under certain conditions, a self-collimation effect in the second energy band (i.e. the energy band over the fundamental band). As disclosed in the article, these conditions determine a negative group velocity.

SUMMARY OF THE INVENTION

The Applicant observes that, for the time being, no practical applications have been shown for a beam of light (although collimated) having a negative group velocity.

Scope of the present invention is therefore to provide a technique for guiding electromagnetic radiation into a physical structure, which is more flexible that the known guiding techniques that use localized and unchangeable waveguides, and which is suitable for application in integrated optical circuits.

The Applicant has found that, by opportunely choosing the geometrical and physical characteristics of a photonic crystal and the wavelength of an electromagnetic radiation to be transmitted therein, it is possible to achieve a particular propagation condition, herein below referred to as "photon guiding", wherein a beam of light can be propagated substantially collimated in a region of the crystal of regular periodicity. More specifically, due to the particular conditions "observed" by a beam of light propagating in a photonic crystal designed according to the present invention, the beam self-collimates during propagation.

Such kind of waveguiding, differently from conventional ways of waveguiding (in particular by internal reflection due to refractive index variation, or by light confinement effect in a photonic crystal having a region of defects), does not require a predetermined and localized waveguiding arrangement, but can occur in any position of the crystal that depends solely on the input position of the beam in the photonic crystal. Moreover, there are no constraints on the width of the guided beam (other than the lateral dimensions of the crystal), since this width corresponds to that of the input beam. Such waveguiding can moreover occur along a plurality of preferred directions coinciding with the crystal axes.

In a preferred embodiment wherein the photonic crystal is made of a bulk dielectric material and has a periodic array of holes filled of air, the parameters to be optimized for designing such a photonic crystal are the relative spacing R, defined as the ratio between the period a of the array of holes and the radius r of the holes, the refractive index n of the dielectric material, and a parameter known as "normalized frequency" and indicated with $\omega_n$, proportional to the ratio between the period a and the desired wavelength $\lambda$ of operation.

The "photon guiding" condition will be defined by reference to a well-known vector parameter, the group velocity (see, for example, the above cited article of Etchegoin), whose direction identifies the energy propagation direction. In particular, the angular distribution of the group velocities about a predetermined propagation direction will be considered. Also, reference will be made to the "first irreducible Brillouin zone" in the reciprocal space, which is well known in the art (and is described, for example, in the text of Ashcroft and Mermin, "*Solid State Physics*", International Edition, Sanders College Publishing).

The present invention relates, therefore, in a first aspect thereof, to a method for guiding electromagnetic radiation, comprising:

providing a photonic crystal made of a bulk material having a first refractive index, said photonic crystal having, at least in a portion thereof, a periodic array of regions with a second refractive index different from the first, said regions having predetermined dimensions and said array having a predetermined period; and feeding to said region of said photonic crystal an electromagnetic radiation having a wavelength in the fundamental photonic band of said photonic crystal, wherein said wavelength, the difference between said first and second refractive indices, the dimensions of said regions and the period of said array are so related that, starting from a isotropic distribution of the wave vectors of said electromagnetic radiation within a first angular range that is twice the angular extension of the first irreducible Brillouin zone of said photonic crystal, the group velocity vectors corresponding to said wave vectors are rearranged as concerns direction and module so that at least 50% of said group velocity vectors are directed within a second angular range that is about one-third of said first angular range and the width at half-maximum of the distribution of the modules of said group velocity vectors is lower than about two-thirds of said second angular range.

In particular, the first angular range correspond to the combination of the first irreducible Brillouin zone and its symmetric about the considered direction.

Preferably, said width at half-maximum is lower than about one-half of the second angular range.

Advantageously, said array of regions may have a triangular, square or rectangular geometry, and said regions have preferably a cylindrical shape and are preferably defined by holes.

In particular, the array may have an equilateral triangular geometry, and in this case the second angular range has an extension of $\pi/9$ and said width at half-maximum is preferably lower than about 0.15 rad, more preferably lower than about 0.12 rad.

When the array has a square geometry, the second angular range has an extension of $(\pi/6)$ and said width at half-maximum is preferably lower than about 0.22 rad, more preferably lower than 0.17 rad.

In a second aspect thereof, the present invention relates to a device for guiding electromagnetic radiation, comprising:

a photonic crystal made of a bulk material having a first refractive index, said photonic crystal having, at least in a portion thereof, a periodic array of regions with a second refractive index different from the first, said regions having predetermined dimensions and said array having a predetermined period;

an optical source, optically linked to said region of said photonic crystal and suitable to generate an electromagnetic radiation having a wavelength in the fundamental photonic band of said photonic crystal, said wavelength being so related to the difference between said first and second refractive indices, to the dimensions of said regions and to the period of said array that, starting from a isotropic distribution of the wave vectors of said electromagnetic radiation within a first angular range that is twice the angular extension of the first irreducible Brillouin zone of said photonic crystal, the group velocity vectors corresponding to said wave vectors are rearranged as concerns direction and module so that at least 50% of said group velocity vectors are directed within a second angular range that is about one-third of said first angular range and the width at half-maximum of the distribution of the modules of said group velocity vectors is lower than about two-third of said second angular range.

Preferably, said width at half-maximum is lower than about one-half of the second angular range.

The device may further comprise an optical waveguide interposed between the optical source and said portion of the photonic crystal for feeding thereto said electromagnetic radiation.

Preferably, said optical waveguide is an integrated optical waveguide or an optical fibre.

Moreover, said regions of the photonic crystal have substantially a cylindrical shape and are defined by holes.

In one possible embodiment, said regions are aligned along an axis and said portion of the photonic crystal comprises a core layer that extends in a plane perpendicular to said axis and is interposed between a first and a second cladding layer, the first and second cladding layers having a refractive index lower than that of the core layer in order to confine said electromagnetic radiation in the core layer. This device advantageously comprises a substrate layer of a dielectric material and a decoupling layer interposed between the substrate layer and the second cladding layer.

The waveguide may be realized on the substrate layer and may be a ridge waveguide, a rib waveguide or a photonic crystal waveguide having a linear defect region.

BRIEF DESCRIPTION OF THE DRAWINGS

Further details may be obtained from the following description, which refers to the accompanying drawings listed below:

FIGS. 9a–9d, 10a–10d, 11, 12 and 13 relate to results of numeric simulations.

DETAILED DESCRIPTION OF THE INVENTION

Figure 1:
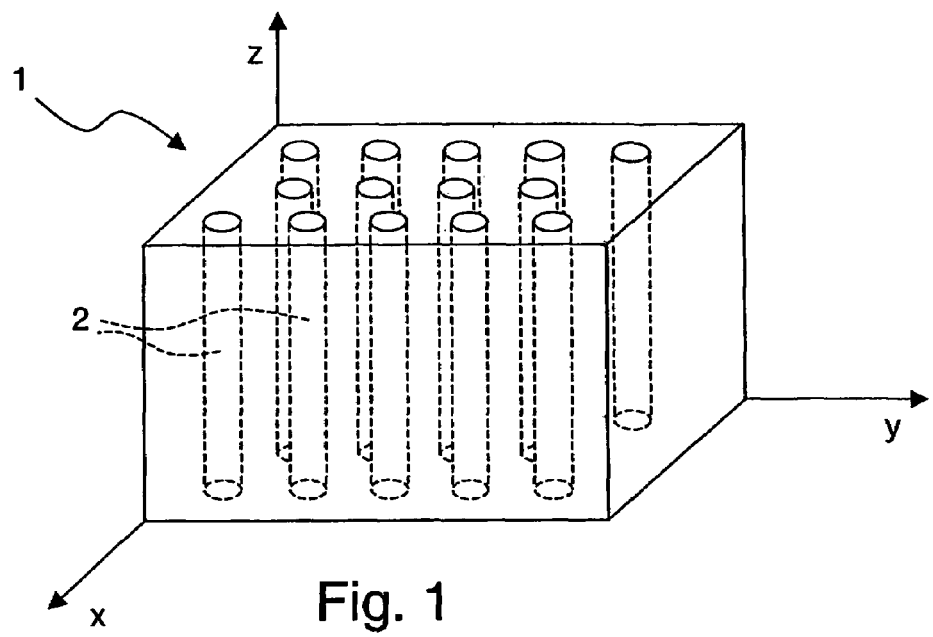
FIG. 1 is an illustrative representation of a 2-D photonic crystal having a regular periodicity.
Figure 2A:
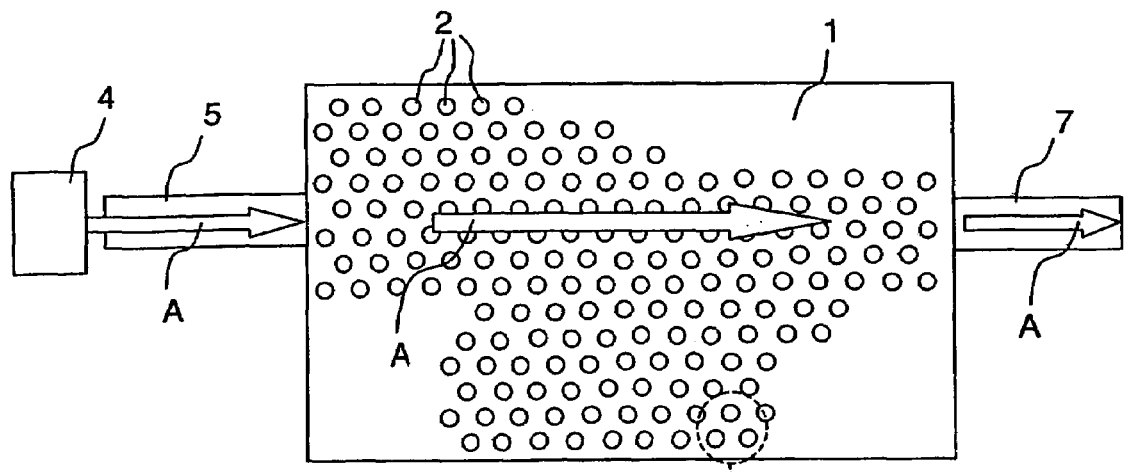
FIG. 2a schematically shows a device for propagating a light beam through a photonic crystal according to the present invention, and 2b show a possible arrangement (triangular in this case) of the holes in a photonic crystal.
Figure 2B:
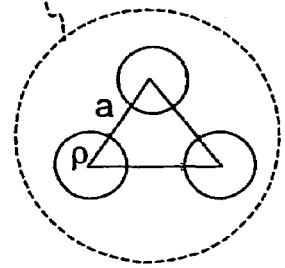

With reference to FIGS. 1, 2a and 2b, it is indicated with 1 a photonic crystal comprising a bulk body 2 made of a dielectric material, wherein a periodic array of holes 2 has been realized. Although a bi-dimensional (2-D) photonic crystal is described, the teaching of the present invention may be extended to three-dimensional (3-D) photonic crystals as well, i.e. crystals having a 3-D distribution of regions of different refractive index than the bulk, such as spheres.

The bulk dielectric material has a refractive index n preferably greater than 1.5. Possible materiales are $SiO_2$, $SiO_xN_y$, GaAs, Si; this list is only illustrative and not exhaustive.

Preferably, holes 2 contain air, are cylindrical and parallel to each other and have a same radius ρ. As shown in FIG. 2b, holes 2 may be arranged to form a triangular array having a period a. Although an arrangement according to an equilateral triangle is illustrated, an arrangement according to an isosceles triangle may be used, as well. Alternatively, holes 2 may be arranged according to a square or a rectangular array. In general, the periodicity of the array is the periodicity of the "cells", each "cell" including three holes for triangular arrays and four holes in square or rectangular arrays.

It can be shown that the preferred transmission directions are those corresponding with the crystal axes. In case of triangular geometry, the crystal axes are those connecting the vertices of the triangles, while in case of square or rectangular geometries the crystal axes correspond to the diagonals of the square or triangle, i.e. the axes connecting opposite vertex. In case of triangular array geometry the three crystal axes are angularly spaced at 60° (π/3), while in case of square array geometry the two crystal axes are angularly spaced at 90° (π/2).

Although the description that follows is referred to a photonic crystal having holes 2 filled with air and of circular cross-section, the teaching of the present inventions extends to photonic crystals wherein the holes contain a predetermined substance different from air or are substituted by rods of a predetermined dielectric material (of different refractive index than the bulk dielectric material), and wherein the holes have cross-sections other than circular, for example square.

In accordance with the above, photonic crystal 1 has a structure that does not vary along an axis z parallel to the axes of holes 2, and that varies periodically in a plane x–y perpendicular to axis z.

Method of manufacturing photonic crystal 1 will not be described in that methods known in the art can be used. Methods for manufacturing photonic crystals and devices comprising photonic crystals are described, for example, in U.S. Pat. No. 5,526,449, U.S. Pat. No. 6,064,511 and in the article of M. Lončar, T. Doll, J. Vučkovič and A. Scherer, "*Design and Fabrication of Silicon Photonic Crystal Optical Waveguides*", Journal of Lightwave Technology, Vol. 18, No. 10, Oct. 2000.

The parameters that determine the guiding characteristics of the photonic crystal 1 are the relative spacing R, defined as the ratio between the period a of the array of holes 2 and the radius ρ of holes 2, the refractive index n of the dielectric material (or, in general, the difference of refractive index between the bulk dielectric material and the substance or material filling the holes), and a further parameter, known as "normalized frequency" and indicated with $\omega_n$, proportional to the ratio between the period a and the wavelength λ of the electromagnetic radiation to be guided.

The condition of "photon guiding", or "waveguiding", is achieved if the photonic crystal 1 is so designed, and the electromagnetic radiation propagating therein has such a wavelength, that a substantial fraction of the energy of the electromagnetic radiation is made to flow in a direction coinciding with one of the crystal axes. The "photon guiding" condition will herein below defined by reference to a well-known vector parameter of the electromagnetic radiation, the "group velocity", whose direction corresponds to that of energy propagation. In practice, starting from an isotropic distribution of the wave vectors, "photon guiding" occurs when the corresponding distribution of the group velocity vectors during propagation is such that:

a predetermined percentage of the group velocities is oriented within a predetermined sub-range of the original angular range;

the angular distribution of the module of the group velocities shows a peak along the considered propagation axis, and has a width at half-maximum lower than a predetermined-value.

In other words, the photon crystal shall be so designed that the group velocities converge towards the desired propagation direction and that most of the energy of the propagating beam is carried by the group velocities so directed.

For the purposes of the present invention, a condition of "photon guiding" of an electromagnetic radiation in a predetermined direction within a photonic crystal is a condition wherein, starting from a isotropic distribution of the wave vectors of said electromagnetic radiation within a first angular range that is twice the angular extension of the first (irreducible) Brillouin zone of the photonic crystal, the group velocity vectors corresponding to said wave vectors are rearranged as concerns direction and module so that at least 50% of the latter group velocity vectors become directed within a second angular range that is about one-third of the first angular range and the width at half-maximum of the distribution of the modules of the group velocity vectors is lower than about two-thirds of the second angular range.

In a preferred condition, the width at half-maximum of the distribution of the modules of said vectors is lower than about one half of the second angular range, and in a more preferred condition, lower than about one-third.

In the description that follows, the angular distribution of the group velocity will be indicated with as r(θ).

In the previous definition of "photon guiding", as in the following of the present description, the width at half-maximum of a distribution r(θ) will be considered as equivalent to the variance of the distribution, wherein the variance a is so defined:

$$\sigma = \sqrt{\frac{\sum_i (\theta_i - \mu)^2 \cdot r(\theta_i)}{\sum_i r(\theta_i)}}$$

where $\theta_i$ indicates the angle with respect to the considered direction, and μ is the average of said distribution about said direction and is equal to 0 for a triangular array and to π/4 for a square array.

Preferred conditions for photon guiding may be expressed in terms of variance σ. In case of a triangular geometry, a preferred condition of "photon guiding" along a crystal axis occurs when, starting from a isotropic distribution of the wave vectors within an angular range of 60° (π/3) about said axis (which is twice the angular extension of the first irreducible Brillouin zone), the group velocity vectors corresponding to said wave vectors are then distributed, as concerns module and direction, so that at least. 50% of the group velocity vectors become directed within an angular range of 20° (π/9) about said axis (i.e. within an angular range that is one-third of the original one) and the variance σ of the module distribution about said axis is lower than about 0.15 rad (i.e. $\sigma^2 <$~0.022 $rad^2$). A better guiding effect may be observed for σ lower than about 0.13 rad (i.e. $\sigma^2 <$~0.017 $rad^2$) and a still better guiding effect for σ lower than about 0.11 rad (i.e. $\sigma^2 <$~0.012 $rad^2$). Choosing a more or a less restrictive condition (in terms of σ) may depend on the particular requirements and conditions, for example on the distance to be covered through the photonic crystal.

In case of a square geometry, a preferred condition of "photon guiding" along a crystal axis occurs when, starting from a isotropic distribution of the wave vectors within an angular range of 90° (π/2) about said axis (which is twice the angular extension of the first irreducible Brillouin zone), the group velocity vectors corresponding to said wave vectors are then distributed, as concern module and direction, so that at least 50% of them are directed within an angular range of 30° (π/6) about said axis (i.e. within an angular range that is one-third of the original one) and the variance σ of the module distribution about said axis is lower than about 0.22 rad (i.e. $\sigma^2 <$~0.049 $rad^2$). A better guiding effect may be observed for a lower than about 0.17 rad (i.e. $\sigma^2 <$~0.029 $rad^2$) and a still better guiding effect for a lower than about 0.12 rad (i.e. $\sigma^2 <$~0.014 $rad^2$).

Propagation under "photon guiding" further requires that the electromagnetic radiation has a wavelength in the fundamental photonic band. It can be shown that the above condition of "photonic guiding" is achieved where the surface of the fundamental energy band (in the ω, $k_x$, $k_y$ space) shows an inflection.

Therefore, differently from waveguiding into conventional photonic crystals, wherein light at a wavelength within the photonic bandgap is conveyed through a localized and unchangeable waveguide typically defined by a line of defects in the photonic crystal, waveguiding into a photonic crystal according to the present invention can occur at a wavelength within the photonic fundamental photonic band and in any region of the photonic crystal of regular periodicity. In practice, a "virtual waveguide" is created when a beam of light is made to propagate into a photonic crystal according to the present invention, since the particular propagation conditions "observed" by the beam of light force it to collimate.

It can therefore be appreciated that the photonic crystal of the present invention does not require any physical waveguide structure such as the linear defect regions of conventional photonic crystals. Dimension and position of a collimated guided beam in the photonic crystal of the present invention are determined by, and correspond to, dimension and position of the input light beam, while the possible propagation directions are those correspond to the crystal axes.

Therefore, if photonic crystal 1 is optically coupled to an optical source suitable to emit electromagnetic radiation at a predetermined wavelength, and if this wavelength is so related to the physical characteristics of the photonic crystal 1 to satisfy the conditions for photon guiding, a device suitable to guide a beam of light at this wavelength can be realized. FIG. 2a shows schematically an optical source 4, for example a known type of laser, optically coupled to photonic crystal 1 by means of a first optical waveguide 5 of a known type, for example an optical fibre or an integrated optical waveguide. A second optical waveguide 7 of a known type is coupled to the photonic crystal 1 opposite the first waveguide 5. Also schematically represented is a beam of light 6 generated by the optical source 4 and fed to the photonic crystal 1 via the first waveguide 5, which is then propagated substantially collimated into the photonic crystal 1 and exits the photonic crystal 1 via the second waveguide 7.

A further important characteristic of the photonic crystal of the present invention is that a plurality of light beams, possibly of different dimensions and directions, can be transmitted simultaneously in the crystal. In particular, it is possible to transmit two or more light beam in the crystal that cross each other so as to define a "X-crossing" structure.

The Applicant has verified that in such a crossing there is no interaction (i.e., no cross-talk) between the electromagnetic fields of the two beams. Possible X-crossing will be described in the following.

A same photonic crystal according to the present inventions may be therefore applied in different ways, for example for guiding a plurality of parallel light beams evenly or differently spaced from each other and having the same or different dimensions, or for guiding a plurality of light beam propagating along different directions (coinciding with crystal axes) and having the same or different directions, which may cross each other in a same or in different regions of the crystal (for example: a beam propagating in a first direction may cross, one after the other, two further beams propagating in a second direction; three beams propagating in three different directions may cross in a same region).

When a plurality of optical beams are propagated, these beams may have a same wavelength or different wavelengths, provided that these wavelengths are suitable for photon guiding in the considered photonic crystal according to the teaching of the present invention.

The Applicant has verified that preferred ranges of the relevant parameters n, R and $\omega_n$ for achieving the said condition of "photon guiding" are, for triangular and square array geometries, the following:

for triangular array geometry:
  relative spacing R: between 0.15 and 0.5, more preferably between about 0.20 and 0.45, still more preferably between about 0.25 and 0.4;
  refractive index n: between 1.5 and 4.5, more preferably between 2.5 and 3.5;
  normalized frequency $\omega_n$: between about 0.17 and 0.42, more preferably between about 0.25 and 0.40.

for square array geometry:
  relative spacing R: between 0.15 and 0.5, more preferably between about 0.20 and 0.45, still more preferably between about 0.25 and 0.4;
  refractive index n: between 1.5 and 4.5, more preferably between 2.5 and 3.5;
  normalized frequency $\omega_n$: between about 0.17 and 0.42, more preferably between about 0.25 and 0.40

As described in the following, there is a relation among these three parameters, so that when two of the three parameters are chosen, the third is fixed.

To find the optimum value ranges of the relevant parameters R, n and $\omega_n$, the following method can be followed.

The method comprises analysing the group velocity distribution resulting from the possible combinations of values of the parameters R, n and $\omega_n$ within predetermined ranges and determining the set of combinations that provide a group velocity distribution suitable to have photon guiding according to the above teaching.

To this aim, a theoretical model the crystal, such as the model proposed in the above-cited article of P. Etchegoin and R. T. Phillips, may be advantageously applied. This model can be initially used for determining the band diagram of the crystal when a couple of values of n and R has been established and can be then used to determine the distribution of the group velocities when predetermined values of R, n and $\omega_n$ are considered.

Figure 3:
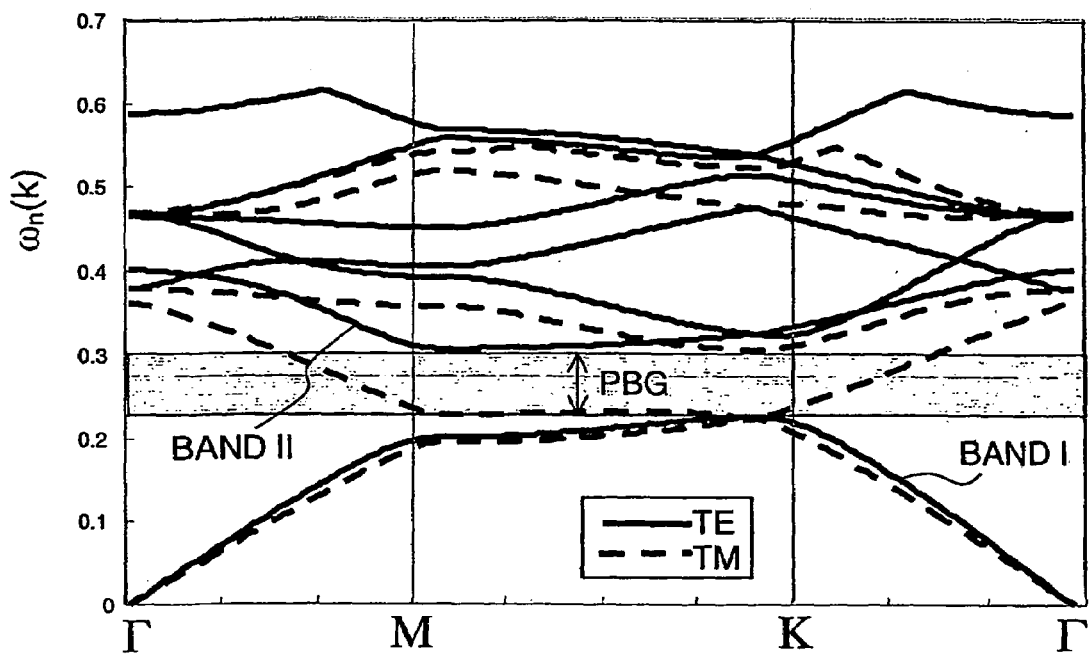
FIG. 3 is an illustrative representation of an energy band diagram for a photonic crystal having a triangular array of holes.

If a 2-D dielectric structure as in FIG. 1 is considered, in particular having an extension along the x and y axes much greater than along the z-axis, an electromagnetic band structure as in the illustrative representation of FIG. 3 is obtained, where Γ, M and K are the well-known parameters identifying the first irreducible Brillouin zone (IBZ), and the continuous and dashed lines correspond to the TE and TM modes, respectively. As concerns the TE modes, a fundamental photonic band (or first band), here indicated with BAND I, and a photonic band-gap PBG, separating the fundamental band BAND I from a second photonic band BAND II, may be identified.

As known from theory of electromagnetic propagation in anisotropic media, energy does not flow in the same direction of k. When energy is represented by dispersion relation $\omega(k)$, it is easily demonstrated that energy flows in the direction of the group velocity $v_g = \nabla_k \cdot \omega(k)$. In fact, it can be shown formally that $v_g$, obtained as a gradient of $\omega(k)$, coincides with the direction of the Poynting vector $S \propto E \times H$ for electromagnetic waves. Therefore, the electromagnetic band structure provides a relation $\omega = \omega(k)$, from which the group velocity $v_g$ can be obtained.

For a predetermined energy it is possible to define two surfaces: the constant energy surface, represented in the $k_x$–$k_y$ plane, obtained directly by the intersection of the 3-D band surface (in the space $\omega$, $k_x$, $k_y$) with a plane with constant abscissa equal to given energy value; and the wave surface, formed by the locus of all possible group velocities and represented in the $v_{gx}$–$v_{gy}$ plane. The wave surface represents the wave front that would emerge from a point source. It can be shown that, for each point of the constant energy surface, the corresponding group velocity is directed perpendicular to said surface. Said article P. Etchegoin and R. T. Phillips illustrates possible shapes for these surfaces for photon focusing.

In order to have a collimated guiding of light within the crystal, these surfaces shall have particular shapes, in particular the constant energy surface (in the $k_x$–$k_y$ plane) shall have straight portions with the broadest possible extension, and the group velocities shall be directed outwards with respect to the centre of the diagram. The wider and the flatter are said portions, the larger will be the range of group velocities having the same direction (i.e. the more collimated will be the guided light). In a triangular array geometry, to have a substantially collimated transmission, the constant energy surface shall have a substantially hexagonal shape, with straight portions defining the edges of the hexagon. Differently, in a square array geometry, the constant energy surface shall have a substantially square shape, and the group velocities will be highly concentrated in the directions perpendicular to the four edges, i.e. in four different directions equally angularly spaced (of $\pi/2$).

Figure 4A:
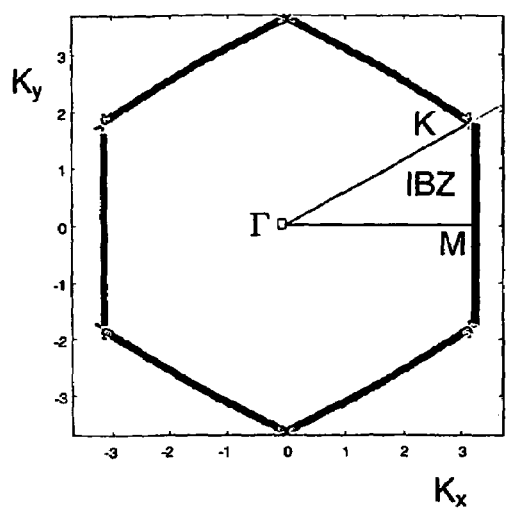
FIGS. 4a and 4b show diagrams of wave-vectors k and group velocities $v_g$ suitable for observing waveguiding in a photonic crystal.
Figure 4B:
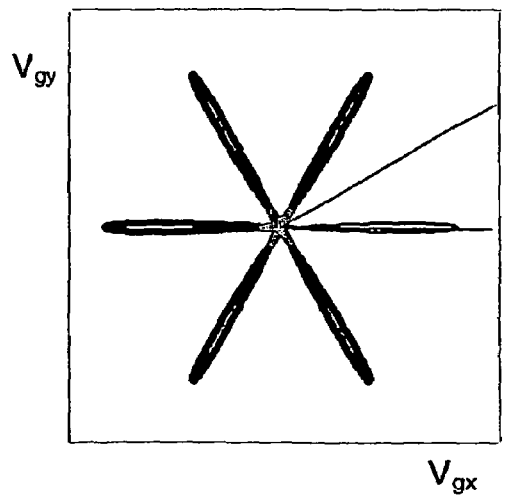

FIG. 4a shows, illustratively, a constant energy surface ($k_x$–$k_y$ plane) of a type suitable for having collimated guiding in case of a triangular array geometry and for the TE mode of a monomode electromagnetic radiation, and FIG. 4b shows the corresponding wave surface ($v_{gx}$–$v_{gy}$ plane).

In the simulation, a isotropic distribution of group velocities about a predetermined crystal axis in an angular range of $\pi/3$ for a triangular array, and of $\pi/2$ for a square array, has to be considered as a starting condition, and the parameters R, n and $\omega_n$ may be varied for example as follows.

The parameter R may be varied in a range that is chosen by taking into account the current technological difficulties in realizing large aspect ratio holes arrays in photonic crystals. A suitable range is for example between 0.15 and 0.45.

The parameter n may be is varied in a range of values including those of the currently most suitable dielectric materials for the manufacturing of photonic crystals, such as $SiO_2$, $SiO_xN_y$ and GaAs, Si: for example the values 1.5, 2, 2.5, 3.25 and 3.5 may be considered.

The third parameter $\omega_n$ may be varied of a predetermined amount (for example $1 \cdot 10^{-4}$) in a predetermined range, for example starting from the maximum value $\omega_{n,max}$ of the first band, until a predetermined condition is satisfied, as explained below.

The simulation model previously mentioned may be advantageously applied in this stage to each couple of values of R and n within the specified ranges, determining each time the value of $\omega_n$ that optimizes the distribution of the group velocity $r(\theta)$.

Figure 5:
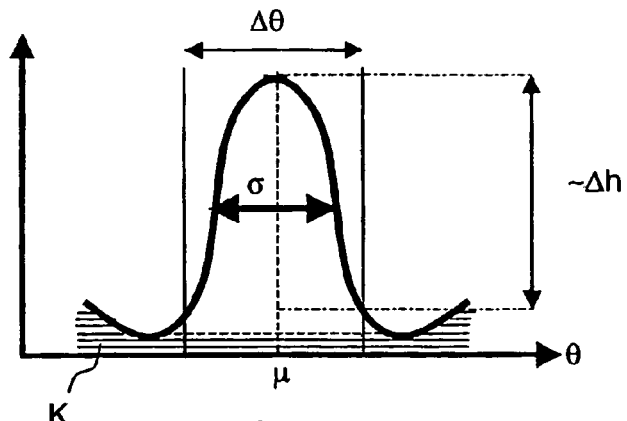
FIG. 5 is an illustrative representation of the distribution of group velocities $v_g$ in the direction of a crystal axis.

In particular, for each couple of values of R and n, the parameter $\omega_n$ is varied of the predetermined amount until the group velocity distribution $r(\theta)$ is optimised in terms of average $\mu$, variance $\sigma$, height $\Delta h$, kurtosis K and percentage of representative points that are within a predetermined angular range $\Delta\theta$ about the considered direction. This angular range, as previously stated, is chosen equal to $\pi/9$ for a triangular array geometry and $\pi/6$ for a square array geometry. In particular, the optimum value of $\omega_n$ is the one that minimizes $\sigma$ and K and maximizes $\Delta h$ and the percentage of points within the angular range $\Delta\theta$. FIG. 5 is an illustrative representation of a group velocity distribution, with an indication of the said parameters, which are defined as follows (definition of $\sigma$ is reported again for sake of clarity):

$$\Delta h = \frac{\max(r(\theta)_{|\theta|<\Delta\theta}) - \min(r(\theta)_{|\theta|<\Delta\theta})}{\min(r(\theta)_{|\theta|<\Delta\theta})};$$

$$\sigma = \sqrt{\frac{\sum_i (\theta_i - \mu)^2 \cdot r(\theta_i)}{\sum_i r(\theta_i)}}$$

where $\mu=0$ for a triangular array and $\mu=\pi/4$ for a square array; and $$K = \frac{\sum_i (\theta_i - \mu)^4 \cdot r(\theta_i)}{\sum_i r(\theta_i)}.$$

When $\omega_n$ is equal to its optimum value, the curve of the group velocity distribution is relatively sharp and has the maximum height $\Delta h$. If $\omega_n$ is varied in one direction or the other with respect to its optimum value, the distribution undergoes an abrupt decrease of $\Delta h$, and an increase of the kurtosis K and of the variance $\sigma$. In particular, variations of the parameter $\omega_n$ with respect to said optimum condition determine either a broadening of the distribution or the appearance of a ring in the curve, and it can be demonstrated that both conditions are undesirable.

When the optimum value of $\omega_n$ is found for a predetermined couple of values of n and R, it is checked if the values of the variance $\sigma$ and of the percentage of points within the specifies angular range for the considered tern of values of n, R and $\omega_n$ satisfies the above-mentioned conditions for photon guiding.

All the terns of value of R, n and $\omega_n$ so detected identify a crystal structure, a bulk material and a wavelength suitable to have photon guiding.

Figure 6:
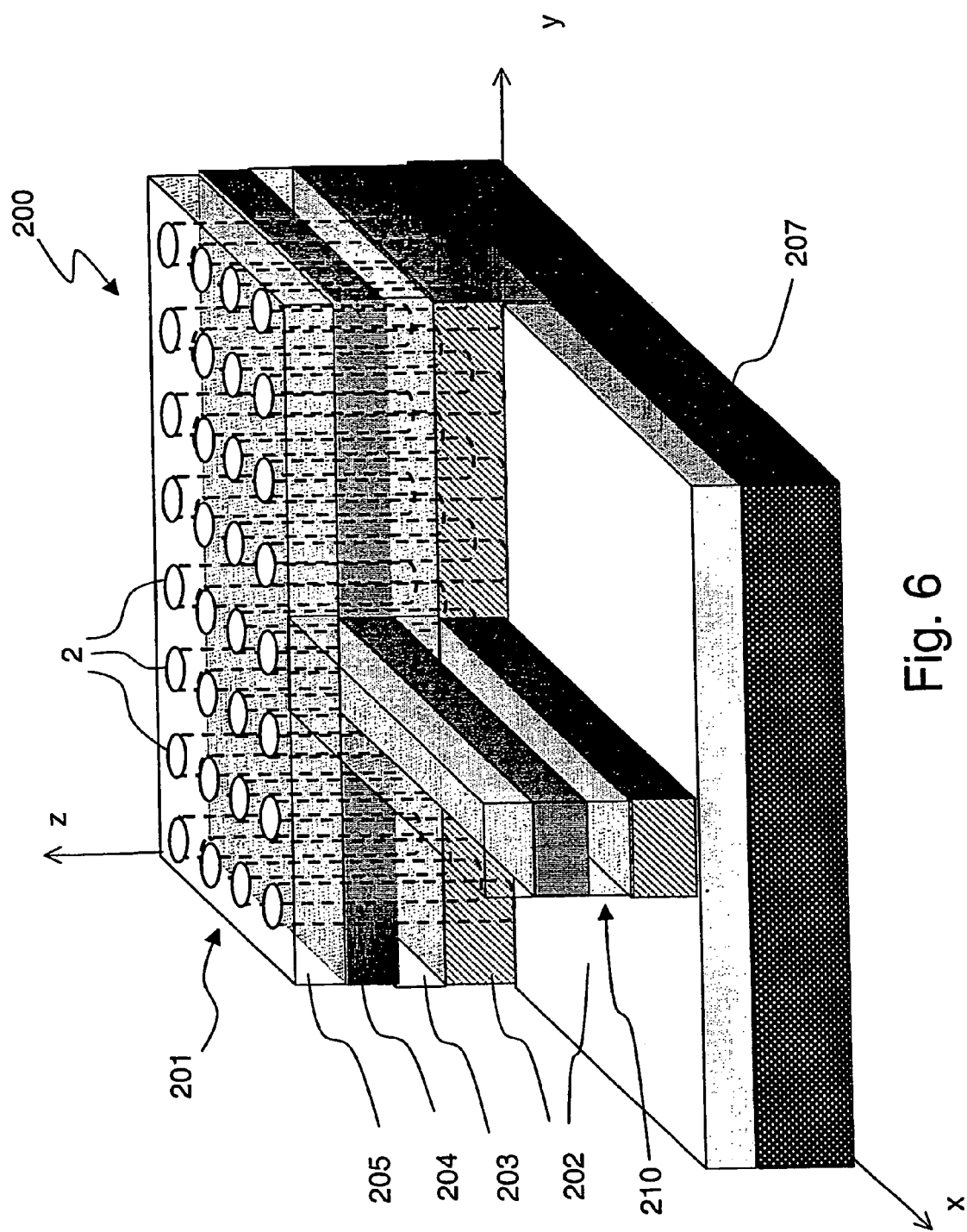
FIG. 6 is an illustrative perspective view of a device for waveguiding electromagnetic radiation according to the present invention.

FIG. 6 illustrates an integrated optical device 200 comprising a substrate 207 and a plurality of layers superimposed on a z direction, in particular a decoupling layer 202, a first cladding layer 203, a core layer 204 and a second cladding layer 205. The refraction index of the core layer 204 is higher than that of the first and second cladding layers 203, 205. The refractive index of the decoupling layer 202 is lower than that of the first cladding layer 203.

Moreover, device 200 has a periodic array of holes 2 that cross layers 205, 204, 203 and 202 along the z direction down to the substrate 207, thus defining a photonic crystal 201. Photonic-crystal 201 is designed according to the present invention. Besides providing a photon guiding effect in a x–y plane, device 200 also confines light in the z direction inside the core layer 204, due to the difference of refraction index of the core layer 204 with respect to the first and second cladding layers 203, 205.

Photonic crystal 201 may be interfaced with different types of conventional waveguides for the input and the output of light, such as ridge waveguides (with shallow edge or deep edge, the latter being also known as "mesa"), rib waveguides, photonic crystal waveguides (with linear defect regions). The input and output of light may be also performed by means optical fibers, in particular by facing the core of the fiber to the core layer 204. In the illustrative example of FIG. 6, device 200 includes a mesa waveguide 210 integrally connected to the photonic crystal 201. Mesa waveguide 210 extends along a direction corresponding to one of the crystal axes of the photonic crystal 201 and has a succession of layers corresponding to those of photonic crystal 201 so that, in the manufacturing process, it may be grown together with photonic crystal 201.

As an example, a device suitable to operate at 1550 nm has a substrate 207 made of GaAs having a refractive index (measured at 25° C.) of 3.374, a core layer 204 made of $Al_{0.37}Ga_{0.63}As$ having a refractive index (measured at 25° C.) of 3.25, first and second cladding layers 203, 205 having a refractive index of 0.01 lower than that of the core layer 204 (by using a different percentage of Al), and a decoupling layer 202 that, in turn, has a refractive index of 0.01 lower than that of the cladding layers 203, 205 (by using a different percentage of Al). The characteristic parameters of the considered photonic crystal are n=3.25, R=0.42 and $\omega_n$=0.26. The radius $\rho$ of holes 2 is 93 nm and the period a of the array is 311 nm. Holes 2 are arranged according to a triangular array and are filled of air.

Such a device provides a $k_x$–$k_y$ and $v_{gx}$–$v_{gy}$ diagrams as those represented in FIGS. 4a and 4b.

Device 200 is only an illustrative example and, in general, a photonic crystal according to the present invention may be used in any type of planar waveguiding structure able to confine light in the z direction.

Figures 7A, 7B:
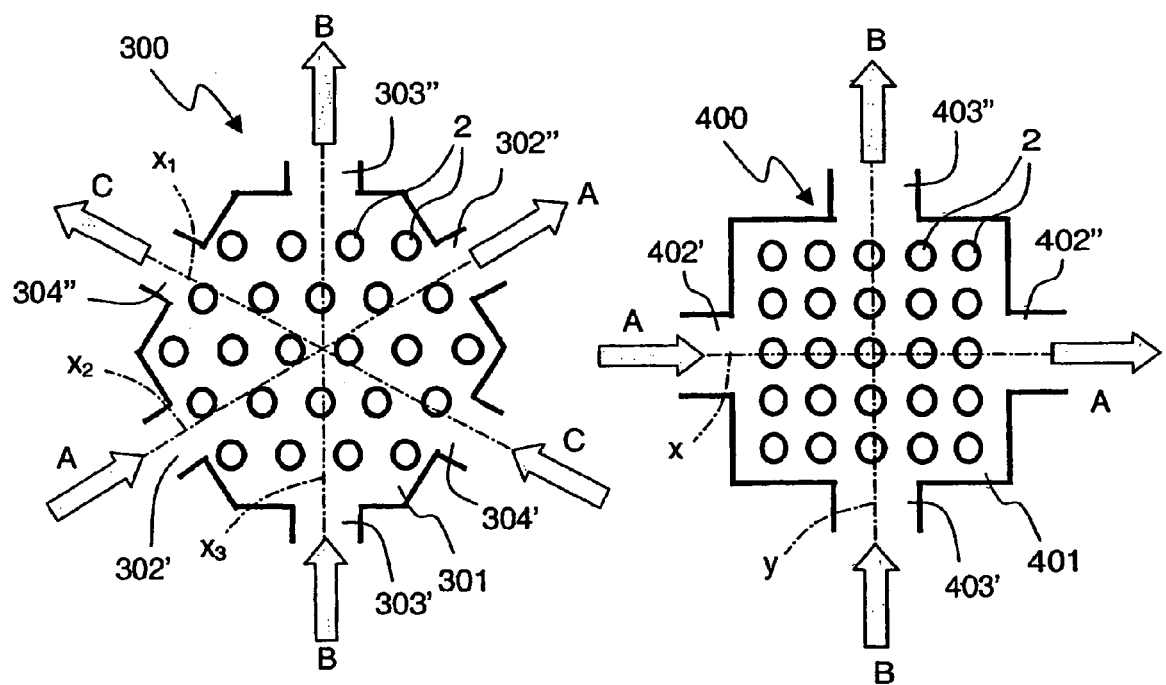
FIGS. 7a and 7b show possible X-crossing devices made in accordance to the present invention.

FIGS. 7a and 7b are illustrative representation of two different X-crossing devices 300, 400 that make use of a photonic crystal according to the present invention, with a triangular and square arrangement of holes 2, respectively. In particular, device 300 comprises a hexagonal photonic crystal structure 301 having a periodic array of holes 2 with equilateral triangular array geometry, and three couples of opposite waveguides 302, 303, 304 directed along the crystal axes, here indicated with $x_1$, $x_2$ and $x_3$. Each couple of waveguides 302, 303, 304 includes an input waveguide 302', 303', 304' and an output waveguide 302", 303", 304". Waveguides 302, 303 and 304 may be, for example, conventional waveguides in integrated optics, or be defined by linear defects regions of a photonic crystal. Alternatively, in place of one or more of waveguides 302, 303 and 304, there may be a corresponding optical fiber (not shown) facing the edge of the photonic crystal.

In use, three different beams of light A, B, C, carrying respective signals and having a same wavelength or close different wavelengths suitable for photon guiding, are fed to the photonic crystal 301 via the input waveguides 302', 303', 304' and propagate collimated into the photonic crystal 301. In the centre of the photonic crystal 301, the three beams A, B, C cross each other. It has been verified that this crossing occurs without mutual interaction among the beams, i.e. without cross-talk. After crossing, the beams continue their propagation to reach the respective output waveguides 302", 303", 304" so that they can exit the device.

A device with an isosceles triangle array geometry may alternatively be used, and the directions of the input and output waveguides shall be varied accordingly, in order to coincide with the directions of the crystal axes.

It can be appreciated that a couple of waveguide may be omitted from device 300, so as to have a device that is simpler but is suitable for crossing only two beams of light.

Device 400 comprises a square photonic crystal structure 401 having a periodic array of holes 2 arranged according to a square geometry, and two couples of opposite waveguides 402, 403 directed along the crystal axes, here indicated with x and y. Each couple of waveguides 402, 403 includes an input waveguide 402', 403' and an output waveguide 402", 403". Waveguides 402, 403 may be, for example, conventional waveguides in integrated optics, or be defined by linear defects regions of a photonic crystal. Alternatively, in place of one or both of waveguides 402, 403, there may be a corresponding optical fiber (not shown) facing the edge of the photonic crystal.

In use, two different signals A and B are fed to the photonic crystal 401 via the input waveguides 402', 403', propagate collimated into the photonic crystal 401, cross each other in the centre thereof without mutual interaction, and continue their propagation by entering the output waveguides 302", 303", 304". Therefore, two different beams of light can cross each other without crosstalk along two directions at 90° to each other.

A device comprising a rectangular structure and/or a rectangular geometry of the array of holes 2 may be used as well.

Figure 8:
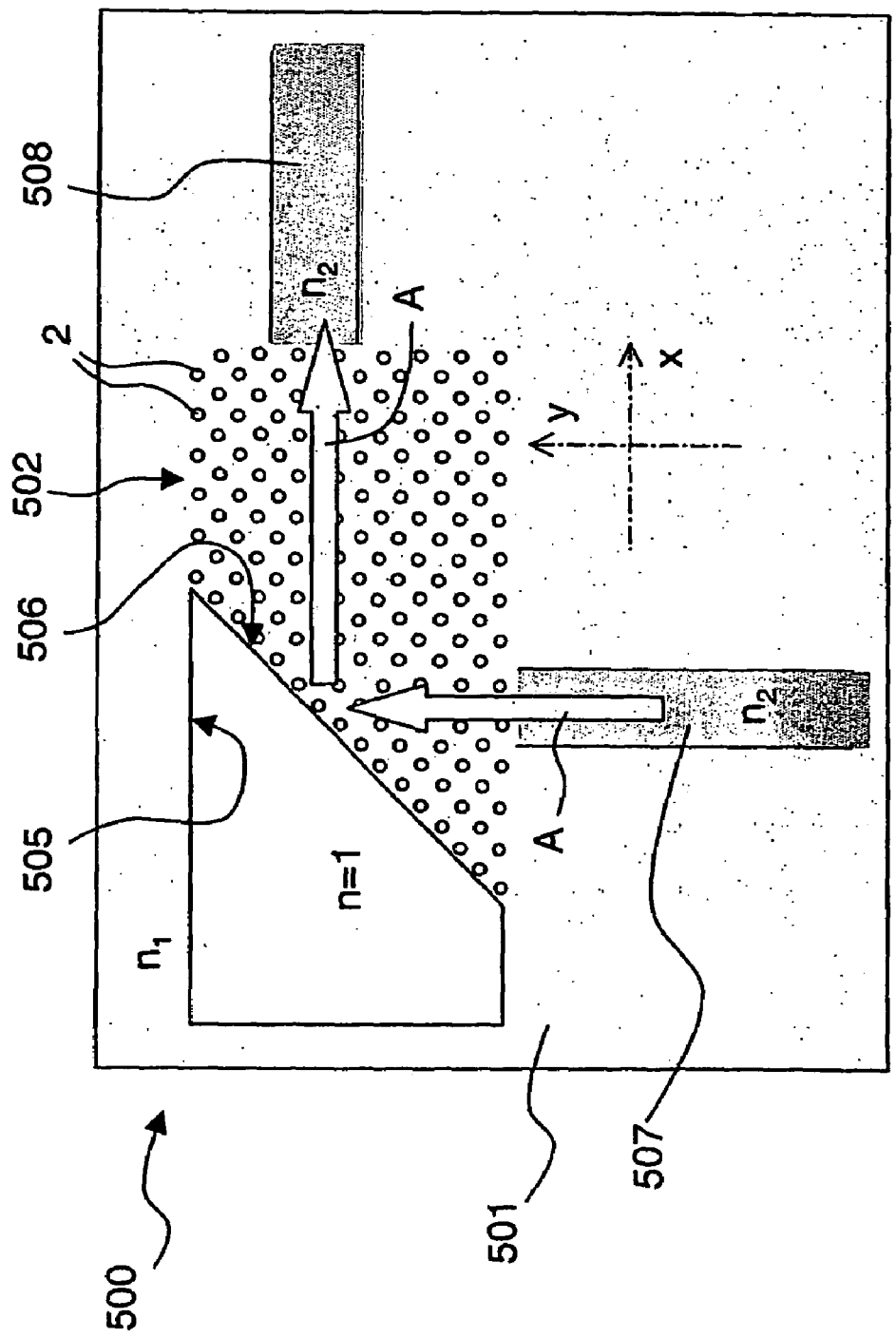
FIG. 8 shows a device for producing a sharp bend of a light beam, according to the present invention.

FIG. 8 shows a device 500 for sharply bending a beam of light. Device 500 comprises a slab 501 of dielectric material of refractive index no that defines, in a portion thereof, a photonic crystal 502 according to the present invention. In the particular example here illustrated, the photonic crystal 502 has a periodic array of holes 2 with square geometry and has therefore two perpendicular crystal axes x, y. One portion of slab 501 has been removed by known techniques so as to define an air gap 505, i.e. a region of space with refractive index n=1. The interface between the photonic crystal 502 and the air gap 505 defines a reflecting surface 506. Surface 506 is so oriented that the normal to surface 506 bisects the two crystal axes x, y.

Device 500 further comprises a first and a second waveguide 507, 508 of a known type, made of a material having a second refractive index $n_2$ different from $n_1$. First and second waveguides 507, 508 are directed along the crystal axes x and y, respectively, and end at the borders of the photonic crystal 502.

In use, one of the two waveguides, for example the first waveguide 507, conveys a beam of light A into the photonic crystal 502. The photonic crystal 502, if the wavelength of the beam A is so related to the refractive index $n_1$ and to the period and radius of the holes 2 as previously described (i.e. so as to satisfy the "photon guiding" condition), guides the beam A along axis y to the reflecting surface 506 and, after reflection, along axis x to the second waveguide 508, where it is newly conveyed in a conventional way.

It can be appreciated that the reflecting surface may be defined in different ways, for example by providing an interface different from air.

The array of holes may also have a different geometry, such as rectangular or triangular. In case of triangular array geometry, reflection may occur at different angles, provided the normal to the reflecting surface bisects the two considered propagation axes; for example, when holes are arranged according to an equilateral triangle, reflection may occur at 60° ($\pi/3$) or 120° ($2\pi/3$). Input and output waveguides shall be oriented accordingly.

EXAMPLE 1

In a first set of simulations, it is shown how the characteristics parameters R, n and $\omega_n$ can be selected for achieving photon guiding. The simulation model previously described has been used for determining the group velocity distributions for different combination of values of said parameters. A photonic crystal having a (equilateral) triangular array of air holes and an initial isotropic distribution of the group velocities has been considered. The analysis is limited to the first dispersion band of the mode TE and it is performed by expressing the group velocity in polar coordinates.

A isotropic distribution of group velocities about a predetermined crystal axis in an angular range of $\pi/3$ for a triangular array, and of $\pi/2$ for a square array, has been considered.

The parameter R has been varied between 0.15 and 0.45 by steps of 0.3; as concern the parameter n, the values 1.5, 2, 2.5, 3.25 and 3.5 have been considered; the parameter $\omega_n$ has been varied of steps of $1 \cdot 10^{-4}$.

FIGS. 9a–9d show the group velocity distributions for R=0.21 and n varying in the set of values 2, 2.5, 3.25 and 3.5. The abscissa axis represents the angles (in rad) and the ordinate axis indicates the normalized value of the group velocity. For each graph, the optimum value of $\omega_n$ has been found by varying this parameter by steps of $1 \cdot 10^{-4}$. Electromagnetic radiation of polarization TE and wavelength in the fundamental photonic band has been considered.

Table I reports, for the different curves of FIGS. 9a–9d, the value of n and the optimum value of $\omega_n$, together with the values of the square of variance ($\sigma^2$), of the kurtosis (K), of the height of the group velocity angular distribution ($\Delta h$), and of the percentage of points (N) originally in a range of $\pi/3$ about the considered propagation direction that have been concentrated within an angular range of $\pi/9$.

TABLE I

Figure 9A:
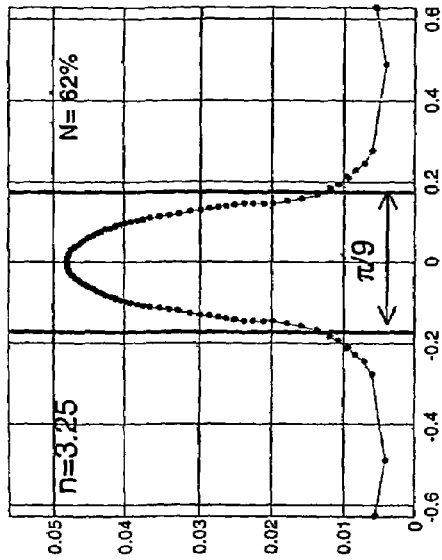
Figure 9B:
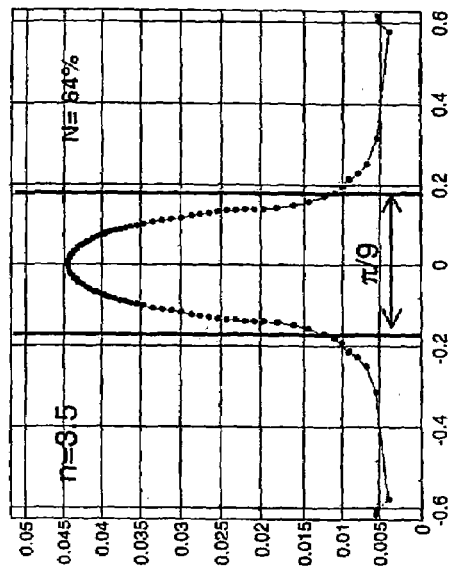
Figure 9C:
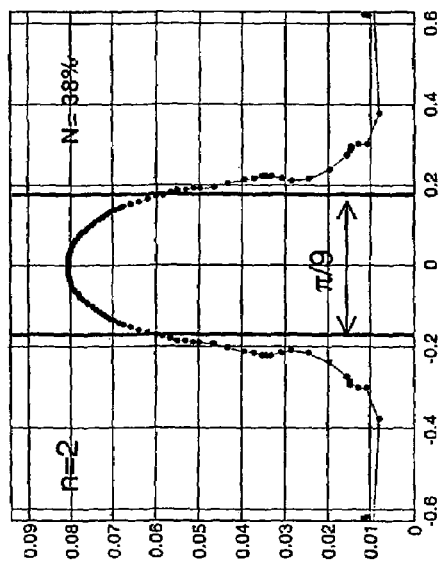
Figure 9D:
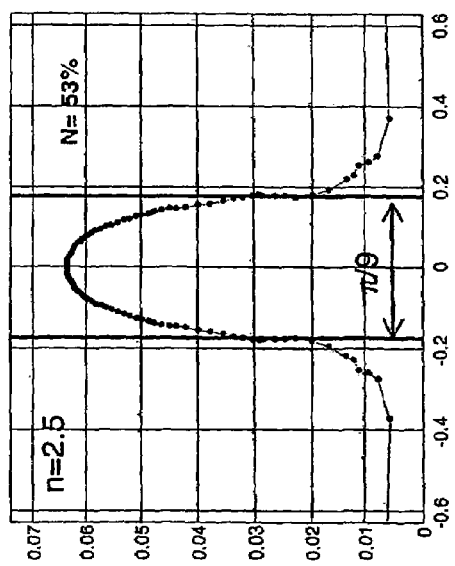

| | | | (R = 0.21) | | | |
|---|---|---|---|---|---|---|
| | | N | $\omega_n$ | $\sigma^2$ [rad$^2$] | K [rad$^4$] | $\Delta h$ | N [%] |
| FIG. 9a | 2 | 0.2954 | $2.5101 \cdot 10^{-2}$ | $3.41 \cdot 10^{-3}$ | 0.35 | 38 |
| FIG. 9b | 2.5 | 0.2377 | $2.0244 \cdot 10^{-2}$ | $4.08 \cdot 10^{-3}$ | 1.77 | 53 |
| FIG. 9c | 3.25 | 0.1839 | $1.7702 \cdot 10^{-2}$ | $4.46 \cdot 10^{-3}$ | 2.5 | 62 |
| FIG. 9d | 3.5 | 0.171 | $1.7793 \cdot 10^{-2}$ | $4.8 \cdot 10^{-3}$ | 2.56 | 64 |

It can be observed that the distribution of FIG. 9a is unsuitable for photon guiding (according to the abovementioned conditions), while the distributions of FIGS. 9b–9d have values of σ and N suitable for photon guiding.

FIGS. 10a–10d show the group velocity distributions for R=0.27 and n varying as above (2, 2.5, 3.25 and 3.5). As previously, the value of $\omega_n$ providing the best distribution has been chosen in each graph.

Table II reports, for the different curves of FIGS. 10a–10d, the values of the characteristics parameters.

TABLE II

| | | (R = 0.27) | | | |
|---|---|---|---|---|---|
| | n | $\omega_n$ | $\sigma^2$ [rad$^2$] | K [rad$^4$] | Δh | N [%] |
| FIG. 10a | 2 | 0.3059 | 1.6973 · 10$^{-2}$ | 4.46 · 10$^{-3}$ | 3.18 | 64 |
| FIG. 10b | 2.5 | 0.2479 | 1.3388 · 10$^{-2}$ | 4.73 · 10$^{-3}$ | 5.64 | 70 |
| FIG. 10c | 3.25 | 0.1931 | 1.1684 · 10$^{-2}$ | 5.57 · 10$^{-3}$ | 7.01 | 70 |
| FIG. 10d | 3.5 | 0.1798 | 1.2108 · 10$^{-2}$ | 5.47 · 10$^{-3}$ | 5.19 | 71 |

It can be observed that all the four distributions suitable for photon guiding, that the distributions of FIG. 10b is a preferable condition, and the distributions of FIG. 10c and FIG. 10d are more preferable conditions for photon guiding.

Table III reports the complete results of the simulation, wherein R is varied between 0.15 and 0.45.

In particular, Table III shows, for each possible combination of values of the parameters R, n, the value of the $\omega_n$ that allows maximizing the guiding effect.

TABLE III

| R | n = 1.5 | n = 2 | n = 2.5 | n = 3.25 | n = 3.5 |
|---|---|---|---|---|---|
| 0.15 | 0.3862 | 0.2908 | 0.233 | 0.1796 | 0.1669 |
| 0.18 | 0.3879 | 0.2925 | 0.22348 | 0.1813 | 0.1685 |
| 0.21 | 0.3905 | 0.2955 | 0.238 | 0.184 | 0.1711 |
| 0.24 | 0.3943 | 0.2999 | 0.2421 | 0.1879 | 0.1748 |
| 0.27 | 0.3996 | 0.306 | 0.248 | 0.1932 | 0.1799 |
| 0.3 | 0.4066 | 0.3142 | 0.256 | 0.2005 | 0.187 |
| 0.33 | 0.416 | 0.3254 | 0.2671 | 0.2107 | 0.1968 |
| 0.36 | 0.4283 | 0.3405 | 0.2823 | 0.2246 | 0.2103 |
| 0.39 | 0.4441 | 0.3605 | 0.3028 | 0.2439 | 0.229 |
| 0.42 | 0.4638 | 0.3875 | 0.3321 | 0.2741 | 0.259 |
| 0.45 | 0.4902 | 0.4299 | 0.3859 | 0.3409 | 0.3295 |

In Table III, three areas have been delimited by different lines, to identify preferred conditions of photon guiding, by taking into account not only the values of σ and N but also the other parameters that characterize the group velocity distribution. In particular, the thin line identify possible conditions of photon guiding, double thin line identify more preferred conditions of photon guiding and heavy line identify still more preferred conditions of photon guiding.

Table IV indicates, per each couple of values (R, n) the percentage of points of the group velocity distribution within an angular range of π/9 about the considered propagation direction, in relation with the optimum values of $\omega_n$ detected for each couple, i.e. in relation to the values of Table III. The analysis has been restricted to the ranges of values of more interest. Areas corresponding to the preferred conditions of photon guiding have been delimited by different kind of lines, as in Table III.

TABLE IV

| | n = 2 | n = 2.5 | n = 3.25 | n = 3.5 |
|---|---|---|---|---|
| 0.21 | 38% | 53% | 62% | 64% |
| 0.24 | 51% | 66% | 73% | 69% |
| 0.27 | 64% | 70% | 70% | 71% |
| 0.3 | 64% | 69% | 72% | 70% |
| 0.33 | 68% | 71% | 70% | 72% |
| 0.36 | 68% | 70% | 72% | 72% |
| 0.39 | 68% | 70% | 72% | 73% |
| 0.42 | 65% | 69% | 74% | 71% |
| 0.45 | 65% | 86% | 72% | 71% |

Table V shows the value of variance $\sigma^2$ (as a percent, fraction) corresponding to the sets of values of Table III. The analysis has been restricted to the ranges of values of more interest. Areas corresponding to different conditions of photon guiding have been delimited by different kind of lines, as in Table III.

TABLE V

| | n = 2 | n = 2.5 | n = 3.25 | n = 3.5 |
|---|---|---|---|---|
| 0.21 | 0.025 | 0.020 | 0.0018 | 0.018 |
| 0.24 | 0.018 | 0.013 | 0.012 | 0.014 |
| 0.27 | 0.017 | 0.013 | 0.012 | 0.012 |
| 0.3 | 0.015 | 0.013 | 0.011 | 0.016 |
| 0.33 | 0.013 | 0.012 | 0.011 | 0.011 |
| 0.36 | 0.014 | 0.012 | 0.011 | 0.010 |
| 0.39 | 0.015 | 0.011 | 0.011 | 0.011 |
| 0.42 | 0.014 | 0.013 | 0.010 | 0.009 |
| 0.45 | 0.019 | 0.013 | 0.010 | 0.012 |

This example shows that it is possible to determine terms of values of R, n and $\omega_n$ that identify conditions of photon guiding.

EXAMPLE 2

The same simulation has been performed for a photonic crystal having a square array of holes. Differently from above, the percentage of points originally in a range of π/2 about the considered propagation direction that have been concentrated within an angular range of π/6 is now considered. The parameters R and n have been varied between 0.15 and 0.45 and between 2 and 3.5, respectively. Table VI reports the results of this simulation. In particular, Table VI shows, for each possible combination of values of the parameters R, n, the value of $\omega_n$ that allows maximizing the guiding effect.

TABLE VI

| R | n = 2 | n = 2.5 | n = 3.25 | n = 3.5 |
|---|---|---|---|---|
| 0.15 | | 0.2043 | 0.1554 | 0.1444 |
| 0.18 | | 0.2029 | 0.1563 | 0.1455 |
| 0.21 | | 0.2045 | 0.1579 | 0.1469 |
| 0.24 | | 0.2077 | 0.1602 | 0.1492 |
| 0.27 | | 0.2104 | 0.1636 | 0.1522 |
| 0.3 | 0.2655 | 0.2154 | 0.168 | 0.1568 |
| 0.33 | 0.2724 | 0.2223 | 0.1745 | 0.163 |
| 0.36 | 0.2819 | 0.2323 | 0.1836 | 0.1719 |
| 0.39 | 0.2944 | 0.25 | 0.1955 | 0.183 |
| 0.42 | 0.3109 | 0.263 | 0.2149 | 0.2028 |
| 0.45 | 0.3374 | 0.2972 | 0.2582 | 0.2487 |

As above, areas corresponding to a possible condition and a more preferred condition for photon guiding have been delimited by a heavy line and a thin line, respectively.

EXAMPLE 3

X-crossing without cross-talk in a photonic crystal according to the present invention has been demonstrated by a numeric simulation.

Figure 11:
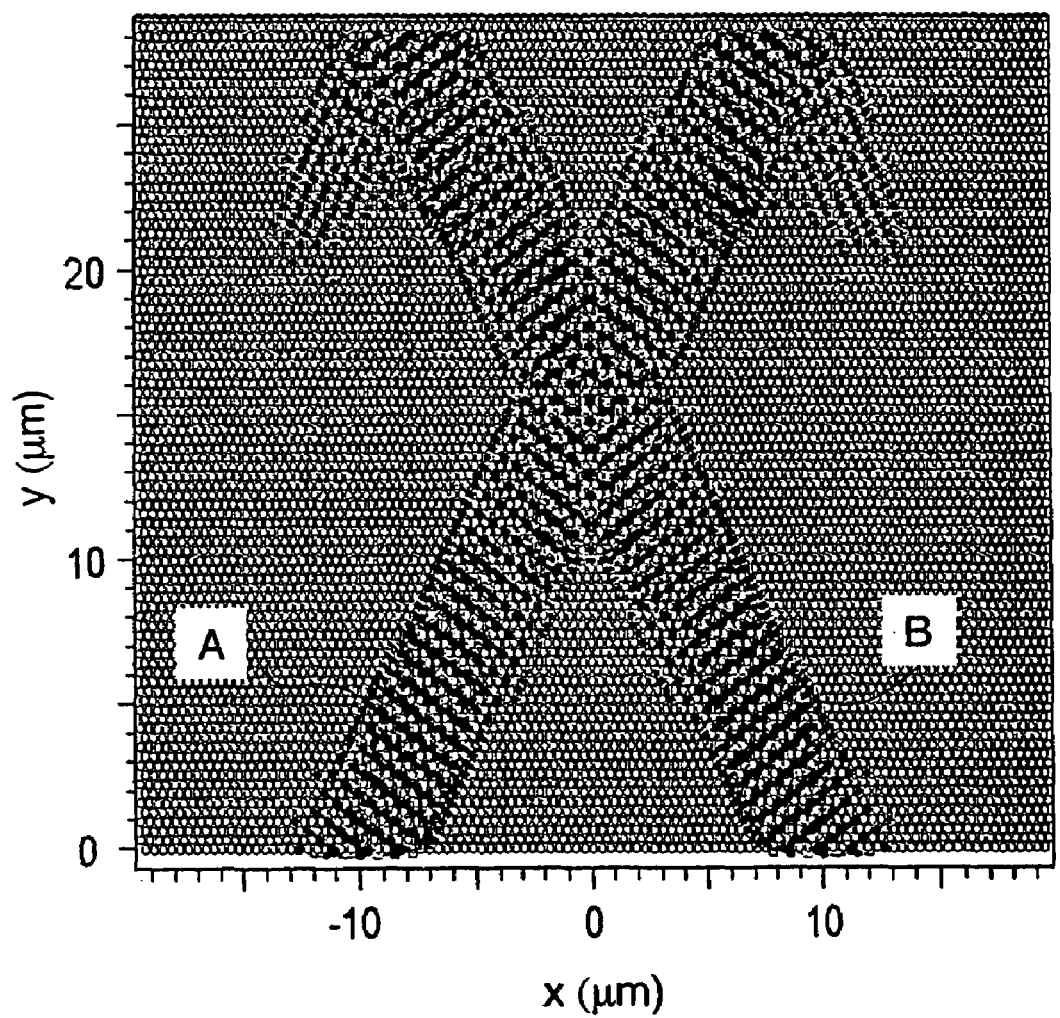

The simulation has been performed by considering a triangular array of holes filled with air, with a period a of 0.372 μm. The bulk refractive index n is 3.5, the normalized spacing R is 0.42 and the normalized frequency $\omega_n$ is 0.24. Two beams of light A, B at wavelengths 1550 nm, having a width of about 5 μm are propagated at 60° from each other along two crystal axes. Only the mode TM is considered. Propagation is simulated in a plane x–y, with input of light at y=0 μm. FIG. 11 shows the propagation of the two beams A, B within the photonic crystal. It can be appreciated that the beams cross each other and no alteration occurs after having left the interaction region (i.e., without cross-talk).

EXAMPLE 4

Figure 12:
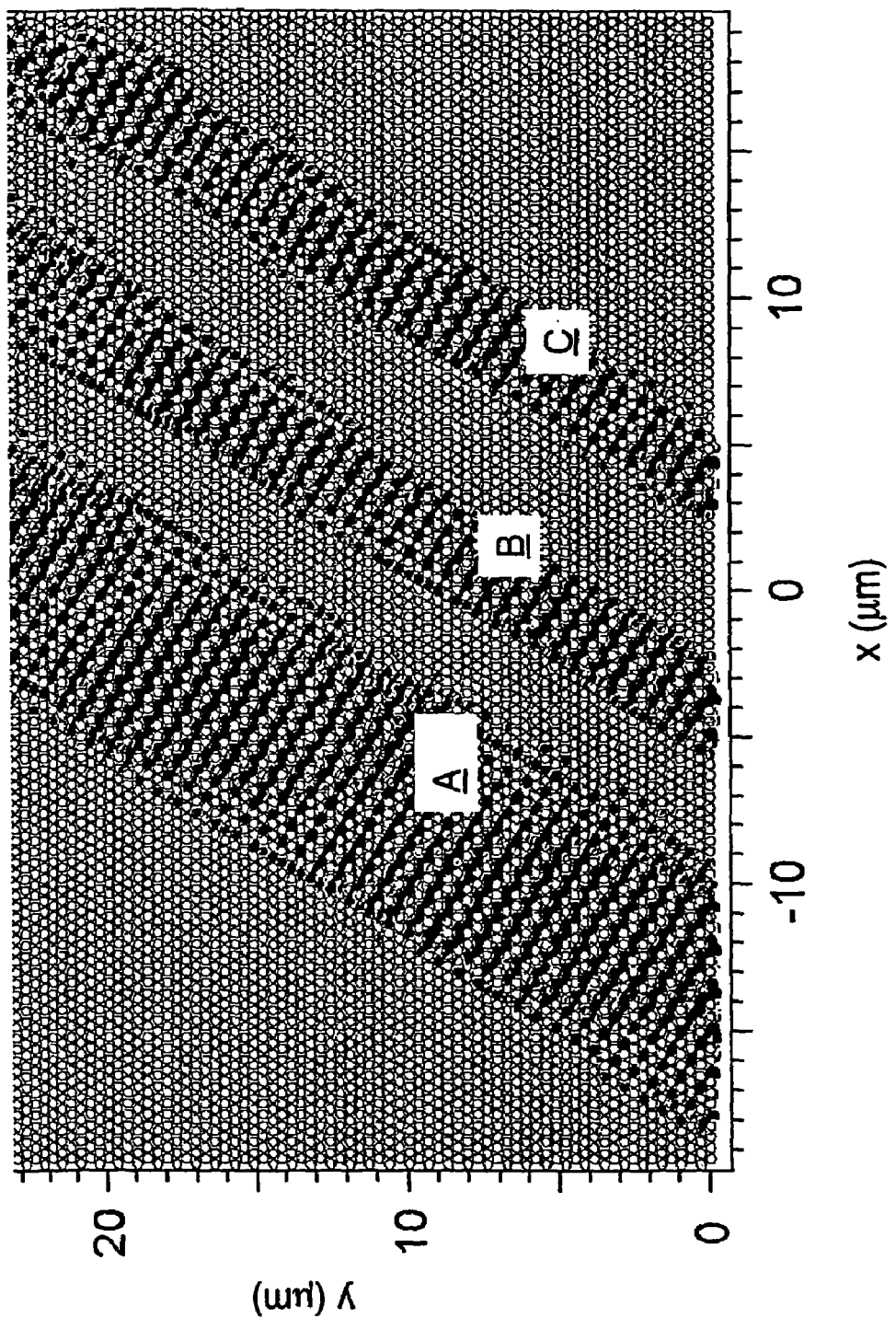

A numeric simulation has been performed for demonstrating the flexibility of the photon guiding technique of the present invention, in particular the possibility of guiding light beams of different dimensions in different positions of the crystal. The same values of Example 3 are considered. Three beams of light A, B, C of different width and at a wavelength of 1550 nm are propagated along a same direction of the crystal. FIG. 12 shows the collimated propagation of the three beams A, B, C.

EXAMPLE 5

Figure 13:
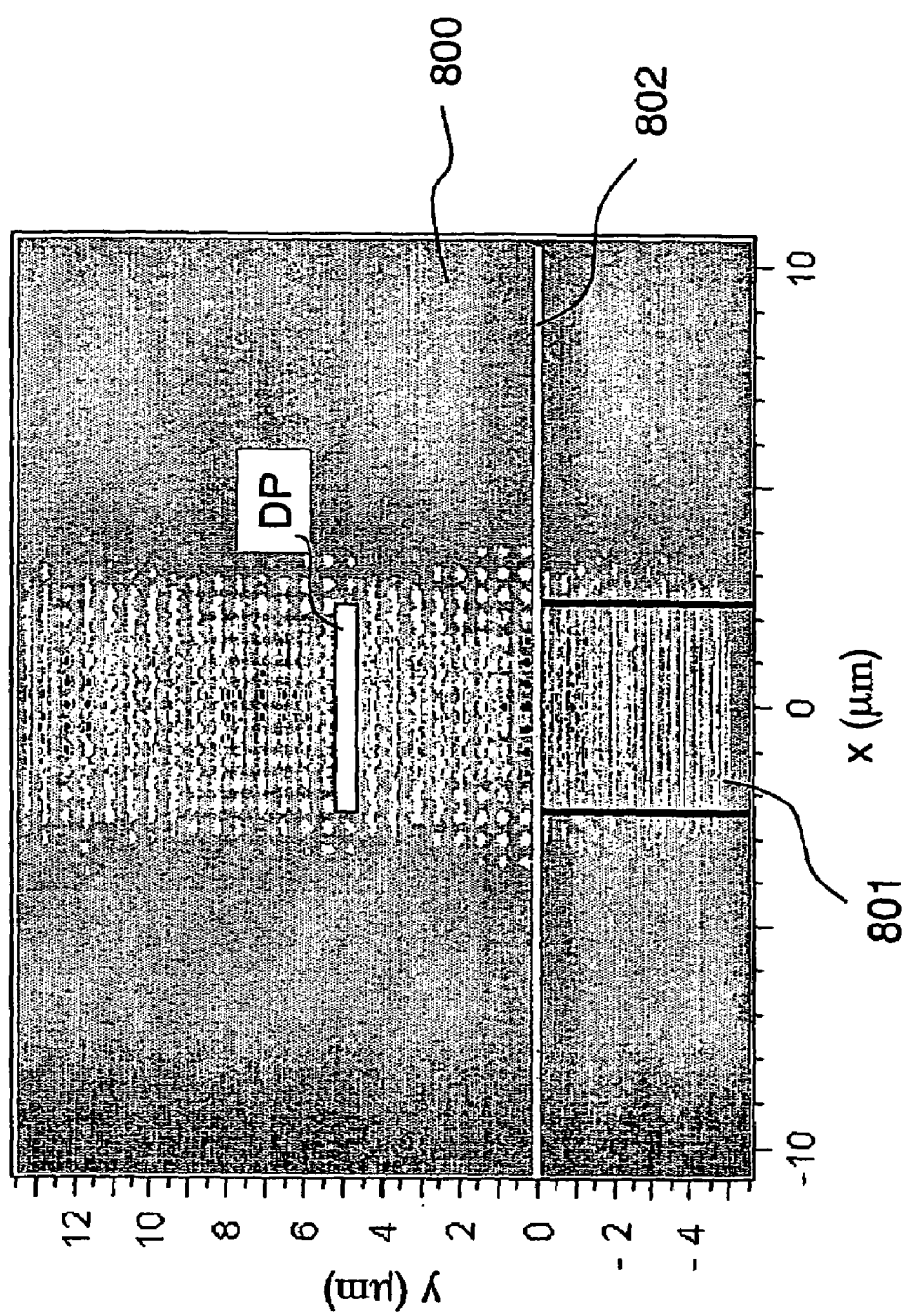

A further numeric simulation has been performed for determining the behavior of a light beam at the interface between a photonic crystal according to the present invention and an integrated waveguide of a known type. FIG. 13 shows, in a plane x–y, a photonic crystal 800 according to the present invention and a conventional integrated waveguide 801. The interface is represented by a line 802 at coordinate y=0.

The photonic crystal 800 has a triangular array of holes filled of air and a bulk refractive index n of 3.5. The normalized spacing R is 0.33 and the operative wavelength is 1550 nm. The normalized frequency $\omega_n$ is 0.188.

Waveguide 801 is a monomode waveguide, having a width of 4.5 μm, a core refractive index of 3.5 and a refractive index step of 0.01. This waveguide simulates, for example, a ridge waveguide. The bulk material is the same as that of the photonic crystal.

A normalized intensity of the input beam is detected at a detection point DP distant 5 μm from the interface 802. It has been observed that the beam intensity at DP is about 98.76% of the input beam intensity. It has also been observed that losses at the interface 802 are small.

What is claimed is:

1. A method for guiding electromagnetic radiation, comprising:
   providing a photonic crystal made of a bulk material having a first refractive index, said photonic crystal having, at least in a portion thereof, a periodic array of regions with a second refractive index different from the first refractive index, said regions having predetermined dimensions and said array having a predetermined period; and
   feeding to said region of said photonic crystal an electromagnetic radiation having a wavelength in the fundamental photonic band of said photonic crystal, wherein said wavelength, the difference between said first and second refractive indices, the dimensions of said regions and the period of said array are so related that, starting from an isotropic distribution of wave vectors, having group velocity vectors which correspond to said wave vectors, of said electromagnetic radiation within a first angular range that is twice the angular extension of a first irreducible Brillouin zone of said photonic crystal, the group velocity vectors corresponding to said wave vectors being rearranged as concerns direction and module so that at least 50% of said group velocity vectors are directed within a second angular range that is about one-third of said first angular range and a width at half-maximum of the distribution of the modules of said group velocity vectors is lower than about two-thirds of said second angular range.

2. The method according to claim 1, wherein said width at half-maximum is lower than about one-half of said second angular range.

3. The method according to claim 1, or 2, wherein said array of regions has a triangular, square or rectangular geometry.

4. The method according to claim 3, wherein said regions have substantially a cylindrical shape.

5. The method according to claim 4, wherein said array has an equilateral triangular geometry, said second angular range has an extension of π/9 and said width at half-maximum is lower than about 0.15 rad.

6. The method according to claim 5, wherein said width at half-maximum is lower than about 0.122 rad.

7. The method according to claim 4, wherein said array has a square geometry, said second angular range has an extension of (π/6) and said width at half-maximum is lower than about 0.224 rad.

8. The method according to claim 7, wherein said width at half-maximum is lower than about 0.164 rad.

9. The method according to claim 4, wherein said array of regions is defined by an array of holes.

10. A device for guiding electromagnetic radiation, comprising:
    a photonic crystal made of a bulk material having a first refractive index, said photonic crystal having, at least in a portion thereof, a periodic array of regions with a second refractive index different from the first, said regions having predetermined dimensions and said array having a predetermined period;

an optical source optically linked to said region of said photonic crystal and suitable to generate an electromagnetic radiation having a wavelength in the fundamental photonic band of said photonic crystal, said wavelength being so related to a difference between said first and second refractive indices, to dimensions of said regions and to a period of said array that, starting from an isotropic distribution of wave vectors, having group velocity vectors which correspond to said vectors, of said electromagnetic radiation within a first angular range that is twice an angular extension of a first irreducible Brillouin zone of said photonic crystal, the group velocity vectors corresponding to said wave vectors being rearranged as concerns direction and module so that at least 50% of said vectors are directed within a second angular range that is about one-third of said angular range and a width at half-maximum of the distribution of the modules of said vectors is lower than about two-thirds of said second angular range.

11. The device according to claim 10, wherein said width at half-maximum is lower than about one-half of said second angular range.

12. The device according to claim 10, or 11, further comprising an optical waveguide interposed between the optical source and a portion of the photonic crystal for feeding thereto said electromagnetic radiation.

13. The device according to claim 12, wherein said optical waveguide is an integrated optical waveguide.

14. The device according to claim 12, wherein said optical waveguide is an optical fibre.

15. The device according to claim 12, wherein said regions have substantially a cylindrical shape.

16. The device according to claim 15, wherein said array of regions is defined by an array of holes.

17. The device according to claim 15, wherein said regions are aligned along an axis and wherein said portion of said photonic crystal comprises a core layer extending in a plane perpendicular to said axis and interposed between a first and a second cladding layer, said first and second cladding layers having a refractive index lower than that of said core layer in order to confine said electromagnetic radiation in said core layer.

18. The device according to claim 17, further comprising a substrate layer of a dielectric material and a decoupling layer interposed between said substrate layer and said second cladding layer.

19. The device according to claim 18, wherein said waveguide is realized on said substrate layer and comprises a ridge waveguide, a rib waveguide or a photonic crystal waveguide having a linear defect region.

* * * * *